United States Patent
Yoshikawa et al.

(10) Patent No.: US 7,245,429 B2
(45) Date of Patent: Jul. 17, 2007

(54) IMAGE DISPLAY DEVICE, REAR PROJECTION TYPE SCREEN USED IN IMAGE DISPLAY DEVICE, FRESNEL LENS SHEET, AND METHOD OF MAKING FRESNEL LENS SHEET

(75) Inventors: Hiroki Yoshikawa, Hiratsuka (JP); Tetsu Ohishi, Hiratsuka (JP); Koji Hirata, Yokohama (JP); Daisuke Imafuku, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/486,830

(22) Filed: Jul. 14, 2006

(65) Prior Publication Data

US 2006/0256433 A1 Nov. 16, 2006

Related U.S. Application Data

(62) Division of application No. 10/857,647, filed on May 28, 2004, now Pat. No. 7,095,558.

(30) Foreign Application Priority Data

Sep. 1, 2003 (JP) .............................. 2003-308198
Sep. 16, 2003 (JP) .............................. 2003-322430

(51) Int. Cl.
G03B 21/56 (2006.01)
G03B 21/60 (2006.01)
G03B 21/28 (2006.01)
G02B 3/08 (2006.01)

(52) U.S. Cl. ..................... 359/460; 359/457; 359/742; 353/33; 353/38; 353/81

(58) Field of Classification Search ................ 359/460, 359/454, 456–457, 742, 831; 353/33, 38, 353/81
See application file for complete search history.

(56) References Cited

U.S. PATENT DOCUMENTS 4,936,657 A * 6/1990 Tejima et al. .................. 349/7

(Continued)

FOREIGN PATENT DOCUMENTS

WO WO02/27399 A1 4/2002

Primary Examiner—W. B. Perkey
Assistant Examiner—Magda Cruz
(74) Attorney, Agent, or Firm—Townsend and Townsend and Crew LLP

(57) ABSTRACT

A total reflecting prism portion is formed on an image generation source side of a Fresnel lens sheet which constitutes a rear projection type screen. The total reflecting prism portion is formed in an area in which the angle of incidence of a projection image projected from an optical part on the Fresnel lens sheet is at least about 40°. The total reflecting prism portion causes incident light to be outputted as output light at a predetermined output angle by a total reflection phenomenon after a first refraction phenomenon. Further, a refracting prism portion is formed on an image monitoring side of the Fresnel lens sheet. The refracting prism portion is formed in an area opposed to the portion where the total reflecting prism portion is not formed. The refracting prism portion causes incident light to be outputted as output light at a predetermined output angle by a second refraction phenomenon.

5 Claims, 15 Drawing Sheets

U.S. PATENT DOCUMENTS

| | | |
|---|---|---|
| 4,963,016 A | 10/1990 | Heijnemans et al. |
| 6,282,034 B1 | 8/2001 | Onishi et al. |
| 6,292,295 B1 | 9/2001 | Yamashita et al. |
| 6,804,055 B2 * | 10/2004 | Peterson et al. ............ 359/457 |
| 6,822,792 B2 | 11/2004 | Goto |
| 6,989,929 B2 * | 1/2006 | Watanabe .................... 359/457 |
| 2005/0099687 A1 | 5/2005 | Watanabe |
| 2005/0111099 A1 * | 5/2005 | Sekiguchi .................... 359/460 |

* cited by examiner

IMAGE DISPLAY DEVICE, REAR PROJECTION TYPE SCREEN USED IN IMAGE DISPLAY DEVICE, FRESNEL LENS SHEET, AND METHOD OF MAKING FRESNEL LENS SHEET

CROSS-REFERENCE TO RELATED APPLICATION(S)

This is a divisional of U.S. patent application Ser. No. 10/857,647, filed May 28, 2004 now U.S. Pat. No. 7,095,558 which application claims priority from Japan Patent Application No. 2003-322430, filed Sep. 16, 2003, and Japan Patent Application No. 2003-308198, filed Sep. 1, 2003, the entire disclosure of which is incorporated herein by reference.

BACKGROUND OF THE INVENTION

The present invention relates to an image display device for projecting and displaying an image from an image generation source on a larger scale onto a rear projection type screen. The invention also relates to the rear projection type screen used in the image display device, a Fresnel lens sheet used in the screen, and a method of making the Fresnel lens sheet.

An image display device which enlarges, using a projection lens, an image displayed on a small-sized image generation source and projects the image onto a rear projection type screen has recently been improved remarkably in image quality. Incidentally, a cathode-ray tube or a liquid crystal display may be used as the small-sized image generation source. The above-mentioned type of image display device has been becoming more and more popular for both home and business use.

The image display device uses a reflecting mirror for reflecting an enlarged image provided from a projection lens and conducting it to the rear projection type screen, thereby decreasing the depth of the device. The rear projection type screen used in the image display device is usually provided with a Fresnel lens sheet and a lenticular lens sheet. The Fresnel lens sheet converts an enlarged projection image into light which is substantially parallel or light which faces somewhat inwards. The lenticular lens sheet diffuses an image light horizontally of the screen. In such a screen, to attain a further reduction in thickness of the image display device, the configuration described for example in WO/02/27399 (Patent Document 1) is known.

SUMMARY OF THE INVENTION

Problems to be solved by the present invention will now be described with reference to FIGS. 8 and 9. When image display devices having the same screen size are compared with each other, the smaller the depth, the more advantages in point of weight, cost and installation space. A reflecting mirror 54 is used for decreasing the depth of an image display device in FIGS. 8 and 9. Making wider the field angle of a projection lens 52 is also a means for decreasing the depth. However, a limit is encountered in widening the field angle of the lens. Suppose that an aspect ratio is 16:9 and a diagonal length is 65 inches. If the projection distance is set at 700 mm or less, an image generation source 51 and the projection lens 52 interfere with projection light. Consequently, a shadow area forms on a rear projection type screen 53. Thus, assume that an attempt is made to attain the reduction of thickness by only widening of the field angle of the projection lens 52; a limit is encountered at a depth of 400 mm of an optical system in the case where an aspect ratio is 16:9 and a diagonal length is 65 inches. Incidentally, a depth of the image display device is 450 mm in this case. In FIG. 8, an optical axis center of the projection lens 52 and the center of the rear projection type screen 53 are aligned with each other and an optical axis and the screen are set perpendicularly to each other. However, by setting the optical axis center of the projection lens 52 in the vicinity of a lower end of the rear projection type screen 53, the image generation source 51 and the projection lens 52 no longer interfere with projection light. This holds true even if the projection distance is set at 700 mm or less. The rear projection type screen illustrated in FIG. 9 is 16:9 in aspect ratio and 65 inches in diagonal length as in FIG. 8. However, the optical axis center of the projection lens 52 is made coincident with the lower end of the screen 53 and the projection distance is set at 500 mm. According to the arrangement illustrated in FIG. 9, the depth of the optical system is 300 mm (the depth of the image display device is 350 mm). Thus, it is possible to attain a further reduction of thickness.

As described above, thickness of the image display device can be reduced as follows. First, shorten the projection distance of the projection lens 52. Then, set the optical axis center of the projection lens 52 at a position near the lower end of the rear projection type screen 53. In this case, however, the following problems newly arise.

In FIG. 9, the screen is 16:9 in aspect ratio and 65 inches in diagonal length. Thus, if the optical axis center of the projection lens 52 is set at a lower end center of the rear projection type screen 53, an incidence angle of image light incident on right and left upper ends of the screen 53 from the projection lens 52 is 65.2. FIG. 10 illustrates a relation between the angle of incidence of light on a screen in a conventional exit surface Fresnel lens and a reflection loss. From the same graph, it is seen that the reflection loss of the screen is as large as 36% in case of the incidence angle of light being 65.2. If the thickness of the image display device is further reduced, the loss becomes larger rapidly. This causes the problem that the image display device becomes dark at right and left upper end portions of the screen.

The foregoing Patent Document 1 discloses a rear projection type screen contributing to the reduction in thickness of an image display device. In this screen, a refracting prism and a total reflecting prism are formed alternately on an incidence surface of light of a Fresnel lens. In addition, an exit surface of light is formed as a plane. In the configuration disclosed in the Patent Document 1, however, a refracting prism is formed on the light incidence surface of the Fresnel lens. Consequently, it causes the problem that efficiency becomes lower and that a middle-area image (a doughnut-like area on the screen), which is an important image area, becomes dark.

The present invention has been accomplished in view of the above-mentioned problems. It is an object of the invention to provide a technique suitable for shortening the depth of an image display device. It is another object of the present invention to provide a technique suitable for shortening the depth of an image display device without greatly impairing the quality (brightness) of an image displayed on a screen.

For achieving the above-mentioned objects, an image display device according to the present invention is characterized in that a total reflecting prism portion for outputting incident light as output light of a predetermined output angle by a total reflection phenomenon after a first refraction phenomenon is formed on an image generation source side of a Fresnel lens sheet which constitutes a rear projection type screen. More specifically, the total reflecting prism portion is formed in an area in which the angle of incidence of a projection image projected from an optical part on the Fresnel lens sheet is at least a predetermined angle (for example, about 40). The image display device is also characterized in that a refracting prism portion for outputting the incident light as output light of a predetermined output angle by a second refraction phenomenon is formed in an area opposed to the portion where the total reflecting prism portion on an image monitoring side of the Fresnel lens is not formed.

In the present invention, the area where the refracting prism portion is formed is an area where light outputted from the total reflecting prism portion overlaps at least one pitch of the refracting prism portion.

In the present invention, a total reflection surface of the total reflecting prism portion formed on the image generation source side of the Fresnel lens sheet which constitutes the rear projection type screen is made concave toward the image generation source side.

A method of making a Fresnel lens sheet according to the present invention is characterized in that a refracting prism portion and a total reflecting prism portion are formed by thermocompression-molidng a transparent base such as polymethyl methacrylate or methyl methacrylate/styrene copolymer on both faces thereof simultaneously. A refracting prism portion on an image monitoring side may be formed by thermocompression-molding and thereafter a total reflecting prism portion may be formed on the opposite side with use of an ultraviolet-curing resin. A transparent base formed with a transparent ultraviolet-curing resin layer having a total reflecting prism portion may be fixed by bonding through an adhesive layer to the side opposite to the side where the refracting prism portion is formed.

In the present invention, the refracting prism portion may be formed throughout the whole surface on the image monitoring side of the Fresnel lens sheet having the total reflecting prism portion. In the area in which the image generation source side of the Fresnel lens sheet is a flat plate, the prism angle of the refracting prism portion is set in a manner as follows. The prism angle becomes larger as the angle of incidence of a projection image projected from the optical part on the Fresnel lens sheet becomes larger. On the other hand, in the area from the position where the projection image passes the total reflecting prism portion formed on the image generation source side up to upper and lower ends, the prism angle of the refracting prism portion is set constant or is made smaller as the angle of incidence becomes larger.

A predetermined incidence surface output angle at a start point of the total reflecting prism portion and a predetermined incidence surface output angle at a portion where the total reflecting prism portion is absent (adjacent to the start point of the total reflecting prism portion) of the Fresnel lens sheet are set almost equal to each other. The former incidence surface output angle is obtained by a first refraction phenomenon and a total reflection phenomenon. The latter incidence surface output angle is obtained by a third refraction phenomenon.

A refractive index of the material of the total reflecting prism portion is set larger than that of the material of the base which constitutes the Fresnel lens sheet. The incidence surface of the total reflecting prism portion is set so as to be inclined incidence surface output angle in the same direction as the total reflection surface of the total reflecting prism portion.

A method of making a Fresnel lens sheet according to the present invention is characterized in that a refracting prism portion on an image monitoring side is formed by thermocompression-molding a transparent base, and thereafter a total reflecting prism portion is formed on the opposite side with use of an ultraviolet-curing resin. The transparent base is formed from polymethyl methacrylate or methyl methacrylate/styrene copolymer, for example. Further, a transparent base formed with a transparent ultraviolet-curing resin layer having a total reflecting prism portion may be fixed by bonding through an adhesive to the side opposite to the side where the refracting prism portion is formed.

According to the present invention, it is possible to reduce the thickness of the image display device. Particularly, the thickness of the image display device can be reduced without greatly impairing the quality, e.g., brightness, of the image displayed on the screen.

DETAILED DESCRIPTION OF THE PREFERRED EMBODIMENTS

First Embodiment

An image display device according to a first embodiment of the present invention will be described in detail hereinunder with reference to the accompanying drawings.

Figure 1:
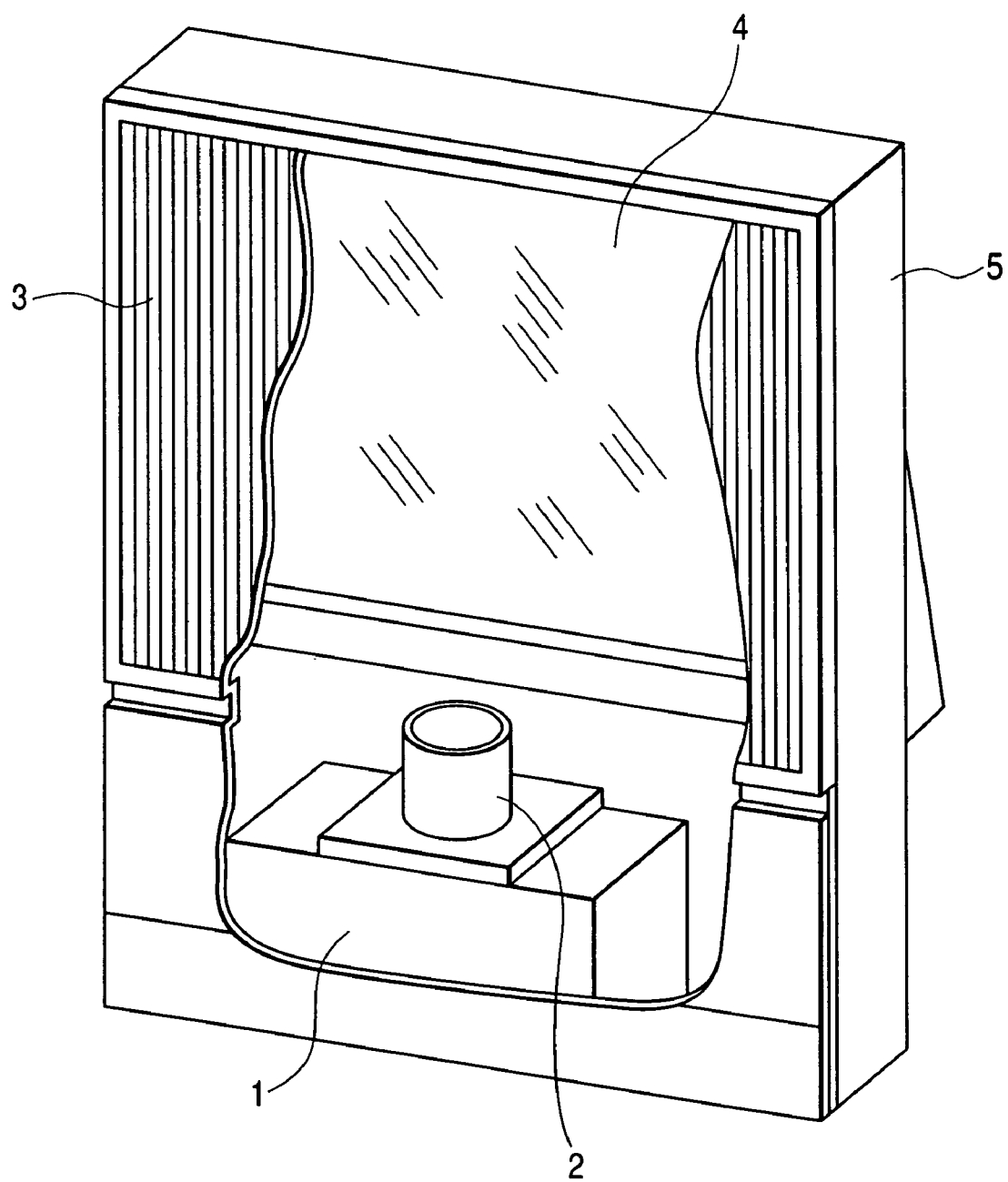
FIG. 1 is a partially sectional perspective view showing an image display device according to a first embodiment of the present invention.

FIG. 1 is a partially sectional perspective view of the image display device. An image generation source 1 includes a projection type cathode-ray tube, a reflection or transmission type liquid crystal panel, and an image modulator such as a display element provided with a plurality of very small mirrors. The image generation source 1 displays a small-sized image. A projection lens 2 projects the image onto a rear projection type screen Since the projection distance is generally long, a reflecting mirror 4 is disposed in a related optical path for diminishing the depth of the image display device. These components are fixed at respective predetermined positions in the interior of a case 5.

Figure 2:
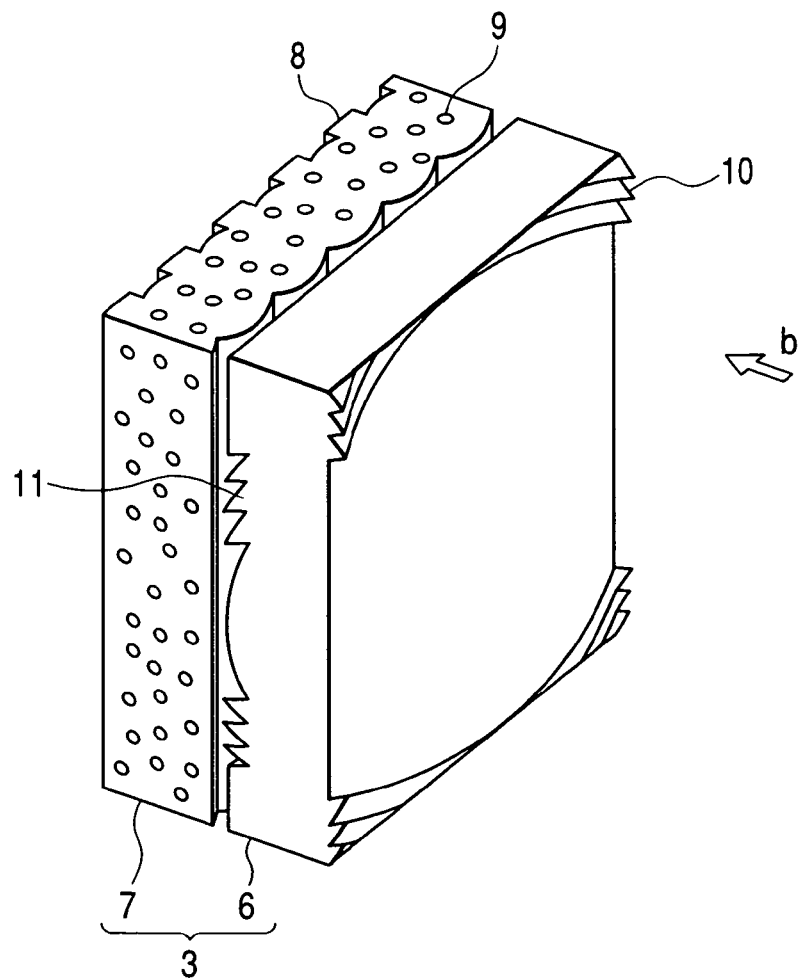
FIG. 2 is a schematic diagram showing the structure of a rear projection type screen 3 used in the first embodiment of the present invention.

FIG. 2 is a schematic diagram showing the structure of the rear projection type screen 3 used in the first embodiment. An enlarged projection image (not shown) projected in the direction of arrow b is converted to light which is substantially parallel or light which faces somewhat inwards while passing through a Fresnel lens sheet 6. Then, the converted light is incident on a lenticular lens sheet 7. As shown in the same figure, the lenticular lens sheet 7 has a shape such that plural lenticular lenses having a longitudinal direction vertically of the screen are arranged horizontally of the screen. The lenticular lens sheet 7 functions to diffuse the image light horizontally of the screen. Black stripes 8 extending vertically of the screen are formed on an exit surface of the lenticular lens sheet 7. The black stripes 8 absorb extraneous light which is incident from the exit side of the screen. Further, a diffusing material 9 is kneaded into the lenticular lens sheet 7. The diffusing material 9 diffuses the image light horizontally and vertically of the screen. In the first embodiment illustrated in FIG. 2, a total reflecting prism portion 10 (first prism) is formed in an area (first area) on the image generation source side of the Fresnel lens. The first area is an area in which the angle of incidence of light projected in arrow b direction on the Fresnel lens sheet is at least a predetermined angle, e.g., about 40 or more. The total reflecting prism portion 10 allows incident light to be outputted as output light at a predetermined output angle by a total reflection phenomenon after a first refraction phenomenon. The image generation source side of the Fresnel lens sheet is formed as a plane portion free of the total reflecting prism portion in an area (second area). The second area is an area in which light of a projection image is incident at an angle smaller than the aforesaid predetermined angle. Further, a refracting prism portion (second prism portion) 11 is formed in an area opposed to the second area on an image monitoring side of the Fresnel lens. The refracting prism portion 11 allows incident light to be outputted as output light at a predetermined output angle by a second refraction phenomenon. The total reflecting prism portion 10 is convexed (projected) toward the image generation source side, while the refracting prism portion 11 is convexed (projected) toward the image monitoring side.

Figure 3:
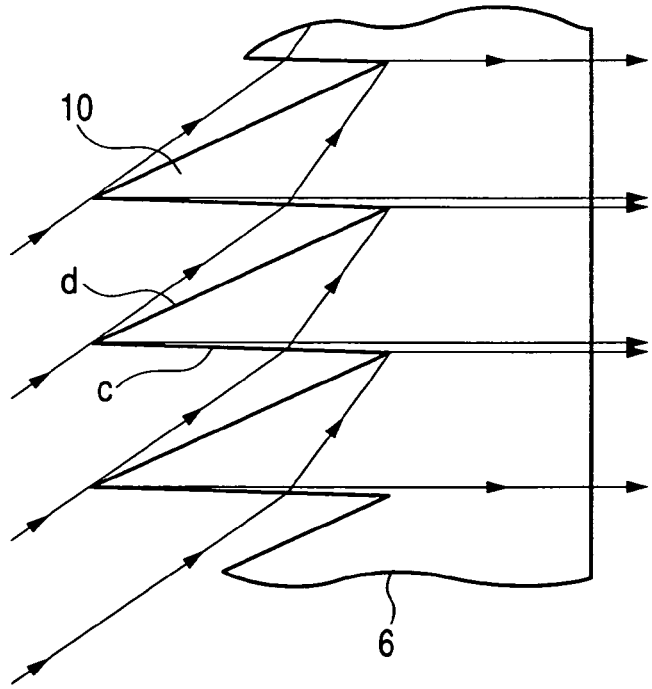
FIG. 3 is a vertical sectional view of a Fresnel lens 6 used in the first embodiment shown in FIG. 2.

The operation of the total reflecting prism portion 10 will now be described with reference to FIG. 3. FIG. 3 is a vertical sectional view of the Fresnel lens sheet 6 according to the first embodiment shown in FIG. 2. In FIG. 3, a vicinity of a left (right) upper end of the rear projection type screen 3 shown in FIG. 1 is illustrated on a larger scale. Arrows indicate the direction of light. As shown in FIG. 3, the total reflecting prism portion 10 is formed on the image generation source side of the Fresnel lens sheet 6. The monitoring side is in a plane shape. Light emitted from the image generation source side is incident on surface c (incidence surface) of the total reflecting prism portion 10 and is totally reflected by surface d (total reflection surface). Then, the reflected light exits nearly horizontally to the monitoring side. Although FIG. 3 is a vertical sectional view of a flat plate portion of the monitoring side, a refracting prism portion is formed in the area opposed to the area where the total reflecting prism portion is not formed. A boundary portion of the two is formed so that output light from the total reflecting prism portion overlaps at least one pitch of the refracting prism portion. The reason for this will be stated below with reference to FIG. 4.

Figure 4:
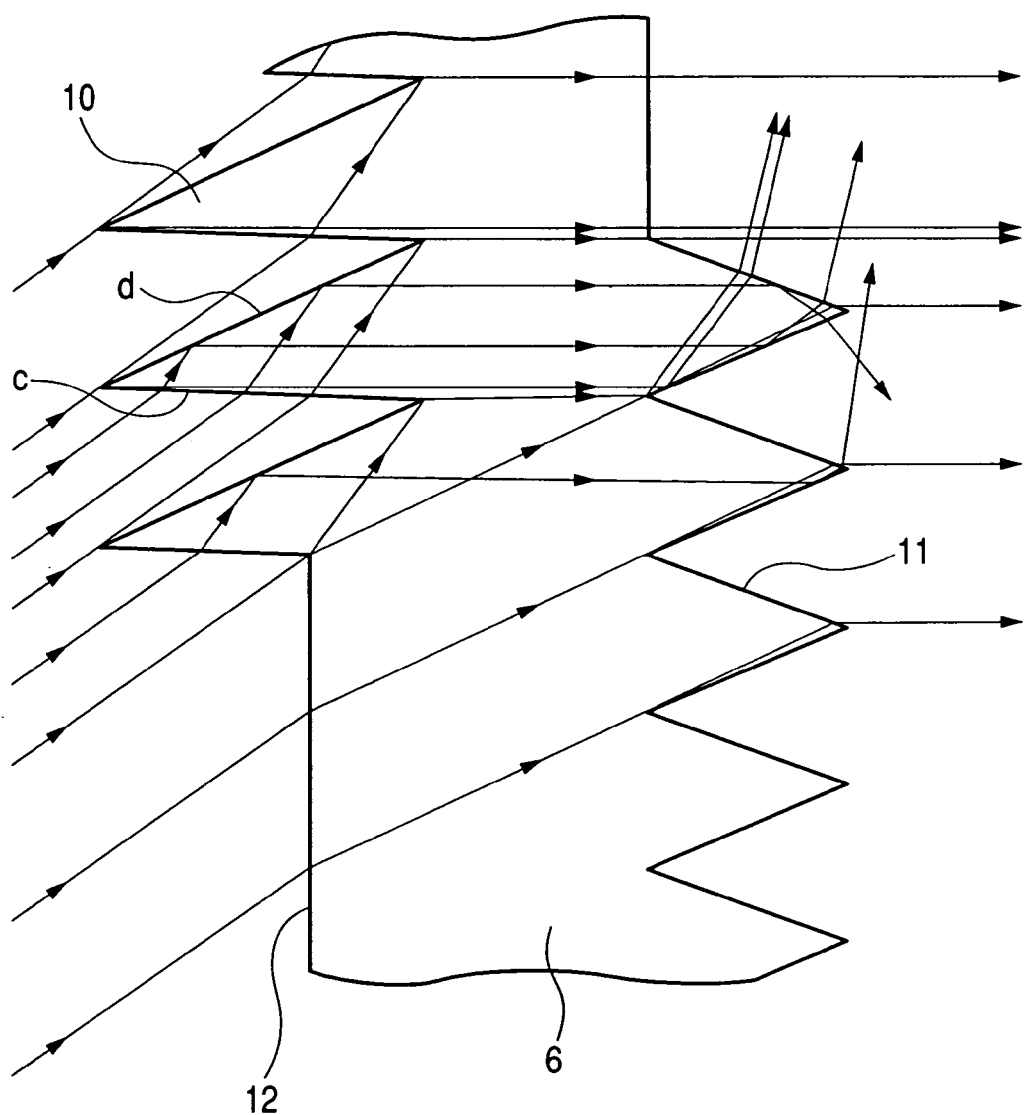
FIG. 4 is a vertical sectional view of the Fresnel lens 6 according to the first embodiment, showing a boundary portion in which a total reflecting prism portion 11 is formed on an image generation source side.

FIG. 4 is a vertical sectional view of the Fresnel lens sheet 6 according to the first embodiment. A boundary portion between the total reflecting prism portion 10 on the image generation source side and the refracting prism portion 11 on the image monitoring side is shown on a larger scale. As shown in FIG. 4, the area (second area) on the image generation source side of the Fresnel lens 6 is a flat portion (plane portion) 12 where the total reflecting prism portion 10 is not formed. The second area is an area on which the image light is incident at a predetermined incidence angle (40) or less. If the angle of incidence on the Fresnel lens sheet 6 of a projection image projected from the optical part on the image generation source side is small, it is impossible to form the total reflecting prism portion 10. Therefore, in an area in which the angle of incidence of the projection image on the Fresnel lens sheet 6 is small, the image generation source side is flat and the refracting prism portion 11 is formed on the monitoring side, like the conventional exit surface Fresnel lens. Thus, in the Fresnel lens sheet 6 according to the present invention, a sudden change occurs from the flat portion on the image generation source side to the portion where the total reflecting prism portion 10 is formed. The image generation source side and the monitoring side of the Fresnel lens are molded using separate molds. Thus, it is difficult to position both sides into complete coincidence due to expansion and contraction caused by a temperature difference. Therefore, when the image generation source side changes from the flat portion to the portion where the total reflecting prism portion 10 is formed, this change must be prevented from appearing in image. That is, it is necessary to use means for such prevention. In the Fresnel lens sheet 6 according to the first embodiment shown in FIG. 4, the boundary portion is formed so that light outputted from the total reflecting prism portion 10 overlaps at least one pitch of the refracting prism portion 11. That is, on the image monitoring side of the Fresnel lens sheet 6, the greater part of the area opposed to the first area is planar. A partial area (the portion opposed to the total reflecting prism portion 10 positioned near the boundary between the first area and the planar second area) is provided with the refracting prism portion 11 at one to several pitches, or several ten pitches, or more. Thus, a part of the total reflecting prism 10 and a part of the refracting prism portion 11 overlap each other in the thickness direction of the Fresnel lens sheet 6.

Light incident on surface c of the total reflecting prism portion 10 is totally reflected by surface d. Then, the reflected light exits as it is if the monitoring side of the Fresnel lens sheet 6 is flat. However, as shown in the figure, when light is incident on the refracting prism portion 11, it is totally reflected by the refracting prism portion 11. Then, the reflected light exits outwards and disappears from the monitoring side. Since the image light is not visible from the monitoring side, the image is broken off. However, there no longer is any such an image defect as the image source side and the monitoring side of the Fresnel lens 6 are dislocated from each other with consequent absence of image light and appearance of a black circular arc. Besides, even if the image is broken off, the amount thereof is only a displacement quantity between both faces. Since the production is carried out with a high accuracy, it is impossible for the image to be markedly broken off.

Figure 5A:
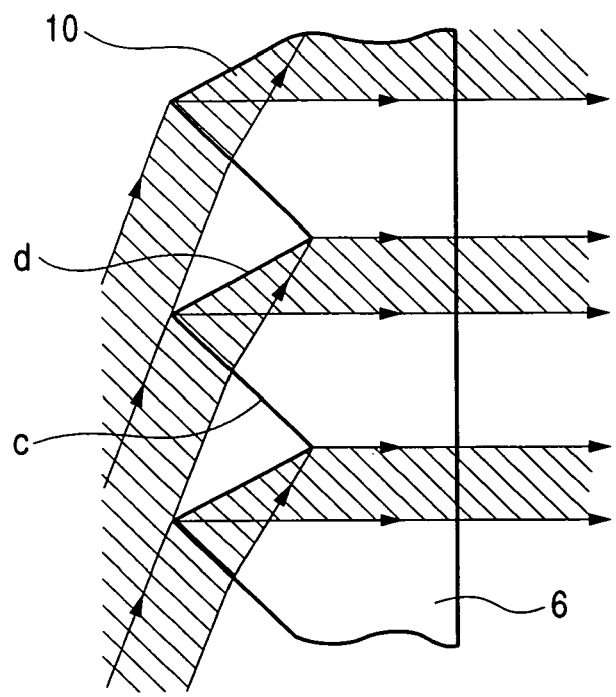
FIG. 5A is a vertical sectional view of the boundary portion where the total reflecting prism portion is formed.
Figure 5B:
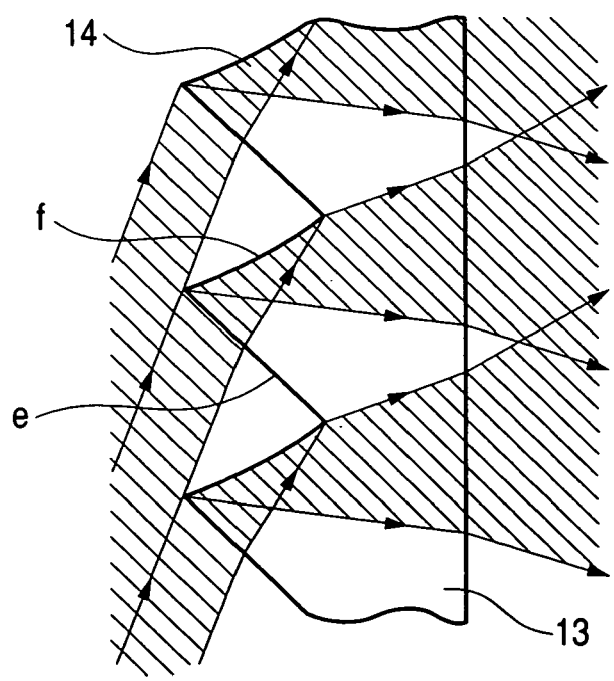
FIG. 5B is a vertical sectional view of a boundary portion where a total reflecting prism portion according to another example in the first embodiment is formed.

Next, another example in the first embodiment will be described with reference to FIGS. 5A and 5B. FIG. 5A is a vertical sectional view of the portion where the total reflecting prism portion 10 of the Fresnel lens sheet 6 in the first embodiment is formed. This portion is the same as in FIG. 4, but is large in the angle of incidence of the projection image on the Fresnel lens sheet 6. In the same figure, only light passing portions are hatched. The same reference numerals and marks as in FIG. 4 denote the same components and portions as in FIG. 4. In the portion shown in FIG. 4 where the angle of incidence of the projection image on the Fresnel lens 6 is small, output light from the Fresnel lens continues substantially without break. However, in the portion shown in FIG. 5A where the angle of incidence of the projection image on the Fresnel lens 6 is large, output light from the Fresnel lens is completely separated into an output light portion and a non-output light portion. The presence of such a light-free portion causes the generation of moiré between the total reflecting prism portion and the lenticular lens sheet 7 in the rear projection type screen 3 or pixels in the image generation source. Thus, it is necessary to use a certain means for preventing the occurrence of moiré. FIG. 5B is a vertical sectional view of a portion where a total reflecting prism portion 14 of a Fresnel lens sheet according to another example in the first embodiment is formed. In FIG. 5B, only light passing portions are hatched. In the same figure, the numeral 14 denotes a total reflecting prism portion formed on an image generation source side of a Fresnel lens sheet 13. In the Fresnel lens sheet 13 according to the present invention shown in FIG. 5B, light is incident from surface e of the total reflecting prism portion 14 and is totally reflected by surface f. The reflected light expands because the surface f is molded concavely to the image generation source side. As a result, image light continues without break on the monitoring side. Consequently, moiré does not occur between the total reflecting prism portion 14 on the image generation source side and the lenticular lens sheet 7 in the rear projection type screen 3 or pixels in the image generation source.

Generally, molding of a prism portion of a Fresnel lens sheet is carried out using an ultraviolet-curing resin. However, in the case where prism portions are provided on both faces of a Fresnel lens sheet like according to the present invention, only one face can be molded because the ultraviolet-curing resin does not transmit ultraviolet light. The Fresnel lens sheet according to the present invention can be fabricated in the following manner.

The first method is as follows. Both faces of a transparent base are thermocompression-molded simultaneously using two opposed molds. The transparent base is formed from polymethyl methacrylate or methyl methacrylate/styrene copolymer, for example. The two opposed molds correspond to a refracting prism portion and a total reflecting prism portion. Since an ultraviolet-curing resin is not used in this method, the Fresnel lens sheet having prism portions on both faces thereof according to the present invention can be fabricated easily.

Figure 6:
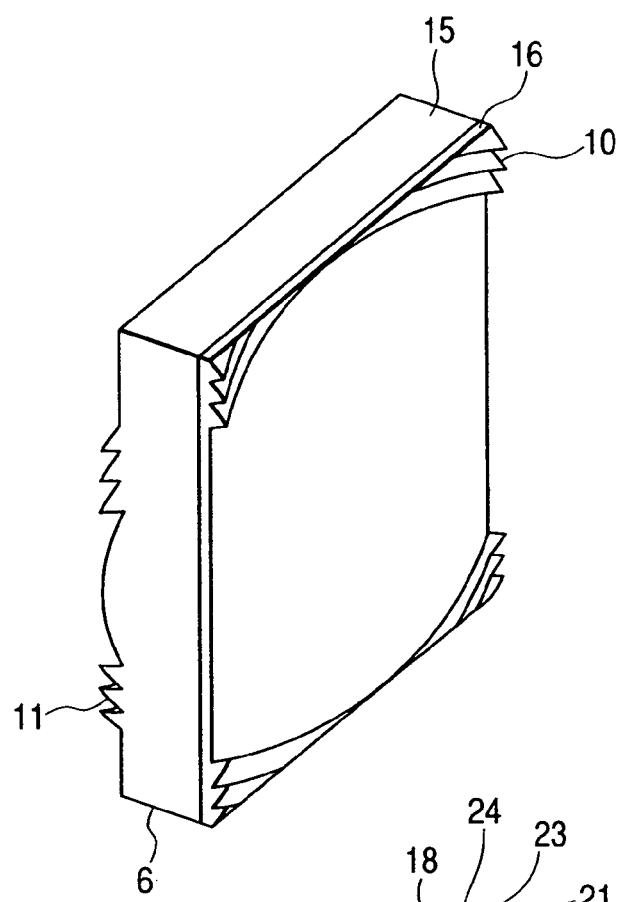
FIG. 6 is a diagram explaining how to fabricate the Fresnel lens sheet in the first embodiment.

FIG. 6 illustrates how to fabricate the Fresnel lens sheet according to the first embodiment. The refracting prism portion 11 is formed by molding on a transparent base 15 which constitutes the Fresnel lens sheet 6. A transparent ultraviolet-curing resin layer 16 is bonded to the face of the transparent base 15 on which the refracting prism portion 11 is not formed. The total reflecting prism portion 10 is formed by molding on the transparent ultraviolet-curing resin layer 16. More specifically, the transparent base 15 such as polymethyl memthacrylate or methyl methacrylate/styrene copolymer is subjected to thermocompression molding to form the refracting prism portion 11 on the image monitoring side. Thereafter, the total reflecting prism portion 10 is formed on the opposite side of the refracting prism portion 11 with use of an ultraviolet-curing resin. In the example shown in FIG. 6, the ultraviolet-curing resin adheres not only to the total reflecting prism portion 10 but also to the plane portion to form the transparent ultraviolet-curing resin layer 16.

Figure 7:
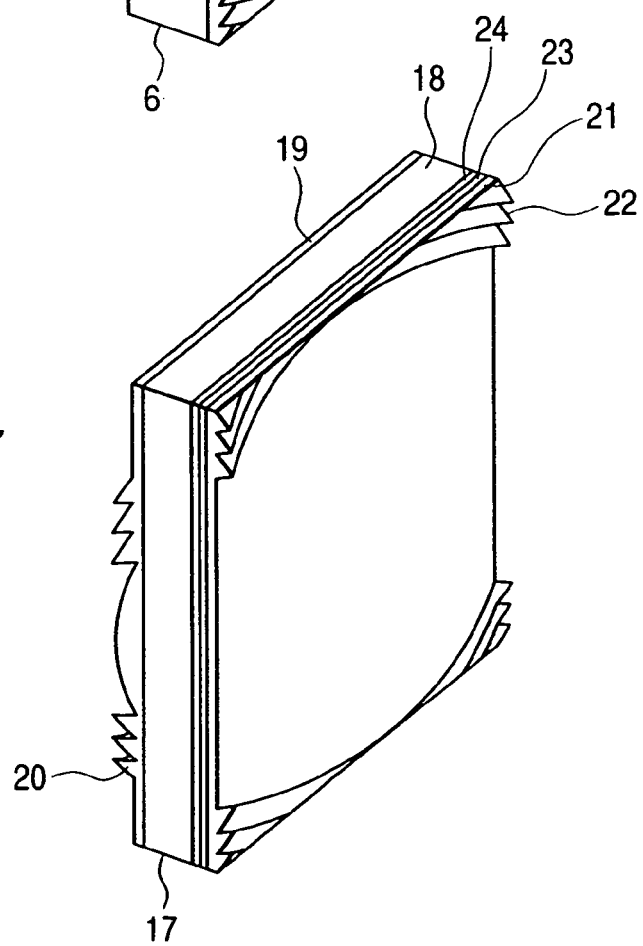
FIG. 7 is a diagram explaining another example of a method of fabricating the Fresnel lens sheet in the first embodiment.
Figure 8:
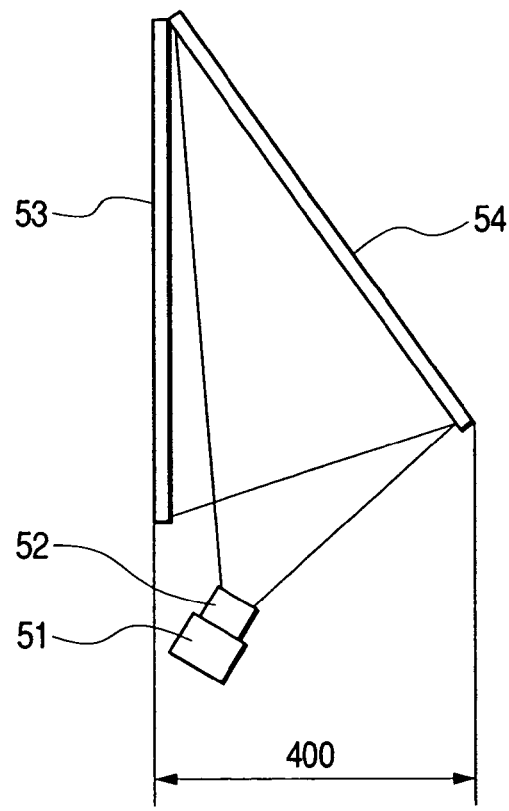
FIG. 8 is a diagram showing a limit encountered in reducing the thickness of an optical system by widening the field angle of a projection lens 52.
Figure 9:
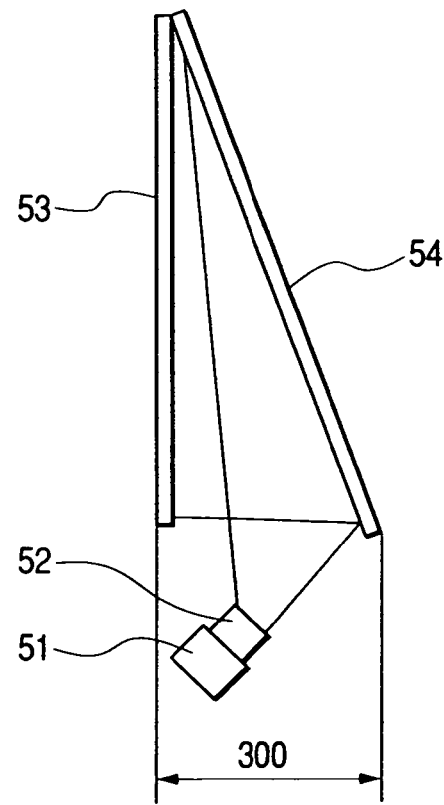
FIG. 9 is a diagram showing the reduction in thickness of the optical system attained by shifting an optical axis center of the projection lens 52 to a lower end center of a rear projection type screen 53.
Figure 10:
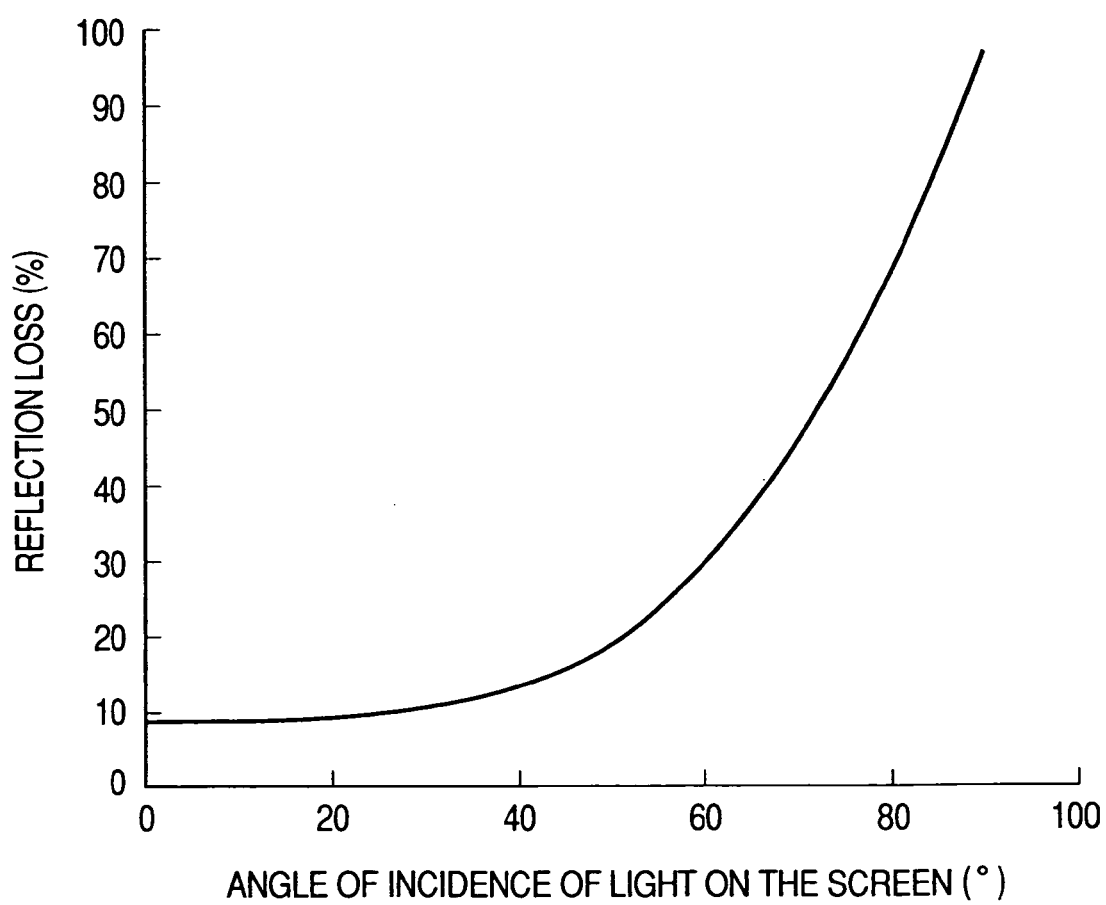
FIG. 10 is a graph showing a relation between the angle of incidence of light on the screen in a conventional exit surface Fresnel lens and a reflection loss.

FIG. 7 illustrates another example of a Fresnel lens sheet fabricating method in the first embodiment. A first transparent ultraviolet-curing resin layer 19 is bonded to a first transparent base 18 which constitutes a Fresnel lens sheet 17. A refracting prism portion 20 is formed on the first transparent ultraviolet-curing resin layer 19. A second transparent ultraviolet-curing resin layer 21 is provided on the first transparent base 18 on the side where the refracting prism portion 20 is not formed. A total reflecting prism portion 22 is formed on the second transparent ultraviolet-curing resin layer 21. More specifically, the second transparent ultraviolet-curing resin layer 21 having the total reflecting prism portion 22 is formed on a second transparent base 23 by an ultraviolet curing method. Thereafter, the total reflecting prism portion 22 is fixed through the second transparent base 23 to the first transparent base 18 by bonding with use of an adhesive layer 24.

As the material of the first transparent base 18 which constitutes the Fresnel lens sheet 17, polymethyl methacrylate or methyl methacrylate/styrene copolymer may be used, for example. Likewise, as the material of the second transparent base 23 on which the second ultraviolet-curing resin layer 21 having the total reflecting prism portion 22 is formed, polyethylene terephthalate may be used. In this case, polyethylene terephthalate has been subjected to a surface treatment for facilitating the bonding thereto of the ultraviolet-curing resin. A highly transparent acrylic adhesive is used as the adhesive layer 24. In the above description, the second transparent ultraviolet-curing resin layer 21 having the total reflecting prism portion 22 is bonded using the adhesive layer 24. The same effect can be attained even if the first transparent ultraviolet-curing resin layer 19 having the refracting prism portion 20 is bonded using an adhesive layer 24.

According to the first embodiment of the present invention described above, an optical axis center of the projection lens is set to a position near the lower end of the rear projection type screen for the purpose of decreasing the depth of the image display device. As a result, the screen incidence angle of image light incident on both right and left upper end portions of the screen may become excessively large. However, the present invention can suppress a reflection loss of the screen. Further, it is possible to diminish the moiré phenomenon which occurs in the Fresnel lens sheet. Thus, according to the present invention, it is possible to provide an image display device which is bright up to both right and left upper end portions of the screen.

Second Embodiment

A second embodiment of the present invention will be described below with reference to the accompanying drawings.

Figure 11:
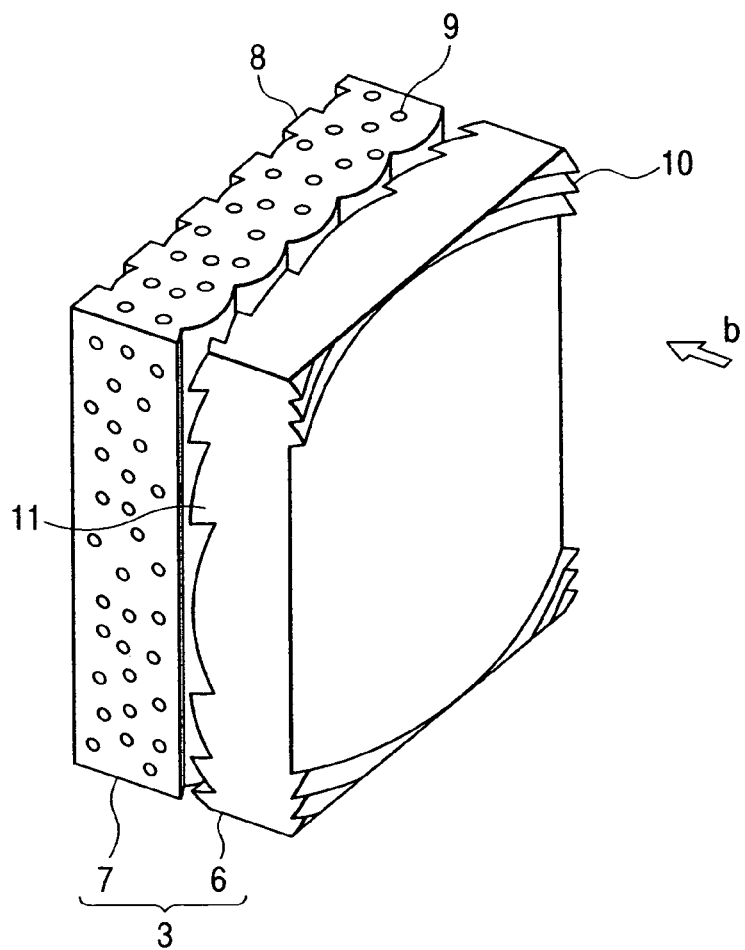
FIG. 11 is a schematic diagram showing the structure of a rear projection type screen 3 according to a second embodiment of the present invention.

FIG. 11 is a schematic diagram showing the structure of a rear projection type screen 3 according to the second embodiment. An enlarged projection image (not shown) projected in the direction of arrow b is converted to light which is substantially parallel or light which somewhat faces inwards while passing through a Fresnel lens 6. Then, the converted light is incident on a lenticular lens sheet 7. As shown in the same figure, the lenticular lens sheet 7 has a shape such that plural lenticular lenses having a longitudinal direction vertically of the screen are arranged horizontally of the screen. The lenticular lens sheet 7 functions to diffuse the image light horizontally of the screen. Black stripes 8 extending vertically of the screen are formed on an exit surface of the lenticular lens sheet 7 to absorb extraneous light which is incident from the exit side of the screen. A diffusing material 9 is kneaded into the lenticular lens sheet 7 to diffuse the image light horizontally and vertically of the screen. The second embodiment illustrated in FIG. 11 is characterized in that a total reflecting prism portion 10 is formed on an image generation source side of the Fresnel lens sheet. More specifically, the total reflecting prism portion 10 is formed in an area in which the angle of incidence of light projected in arrow b direction on the Fresnel lens sheet is at least about 40 or more. The total reflecting prism portion 10 allows incident light to be outputted at a predetermined incidence surface output angle by a total reflection phenomenon after a first refraction phenomenon. The second embodiment is also characterized in that a refracting prism portion 11 is formed throughout the whole surface on an image monitoring side of the Fresnel lens sheet.

Figure 12:
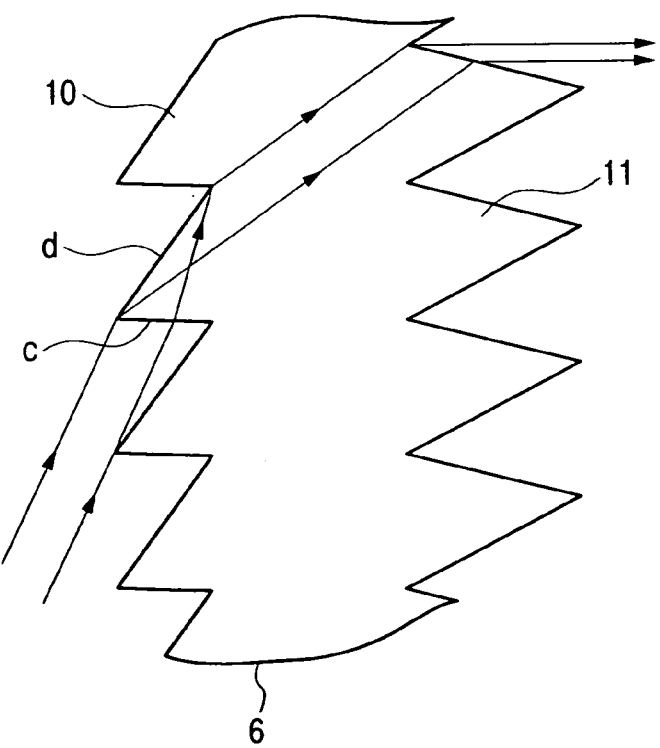
FIG. 12 is a vertical sectional view of a Fresnel lens sheet 6 used in the second embodiment shown in FIG. 11.

The operation of the total reflecting prism portion 10 will now be described with reference to FIG. 12. FIG. 12 is a vertical sectional view of the Fresnel lens sheet 6 according to the second embodiment shown in FIG. 11. In FIG. 12, a vicinity of a left (right) upper end of the rear projection type screen 3 shown in FIG. 11 is illustrated on a larger scale. Arrows in the figure indicate the direction of light. As shown in FIG. 12, the total reflecting prism portion 10 is formed on the image generation source side of the Fresnel lens sheet 6. The refracting prism portion 11 is formed on the monitoring side of the Fresnel lens sheet. Light emitted from the image generation source side is incident on surface c (incidence surface) of the total reflecting prism portion 10 and is totally reflected by surface d (total reflection surface). Then, the reflected light is refracted by the refracting prism portion 11 and exits nearly horizontally to the monitoring side. The angle of light after the total reflection can be made nearly horizontal by enlarging the angle of surface d. However, in the present invention, the angle of surface d is set small to keep large the angle of light after the total reflection. The light is then refracted by the refracting prism portion 11 on the exit side. Thereafter, the light is outputted nearly horizontally to the monitoring side. The reason for this will be stated below with reference to FIG. 13.

Figure 13:
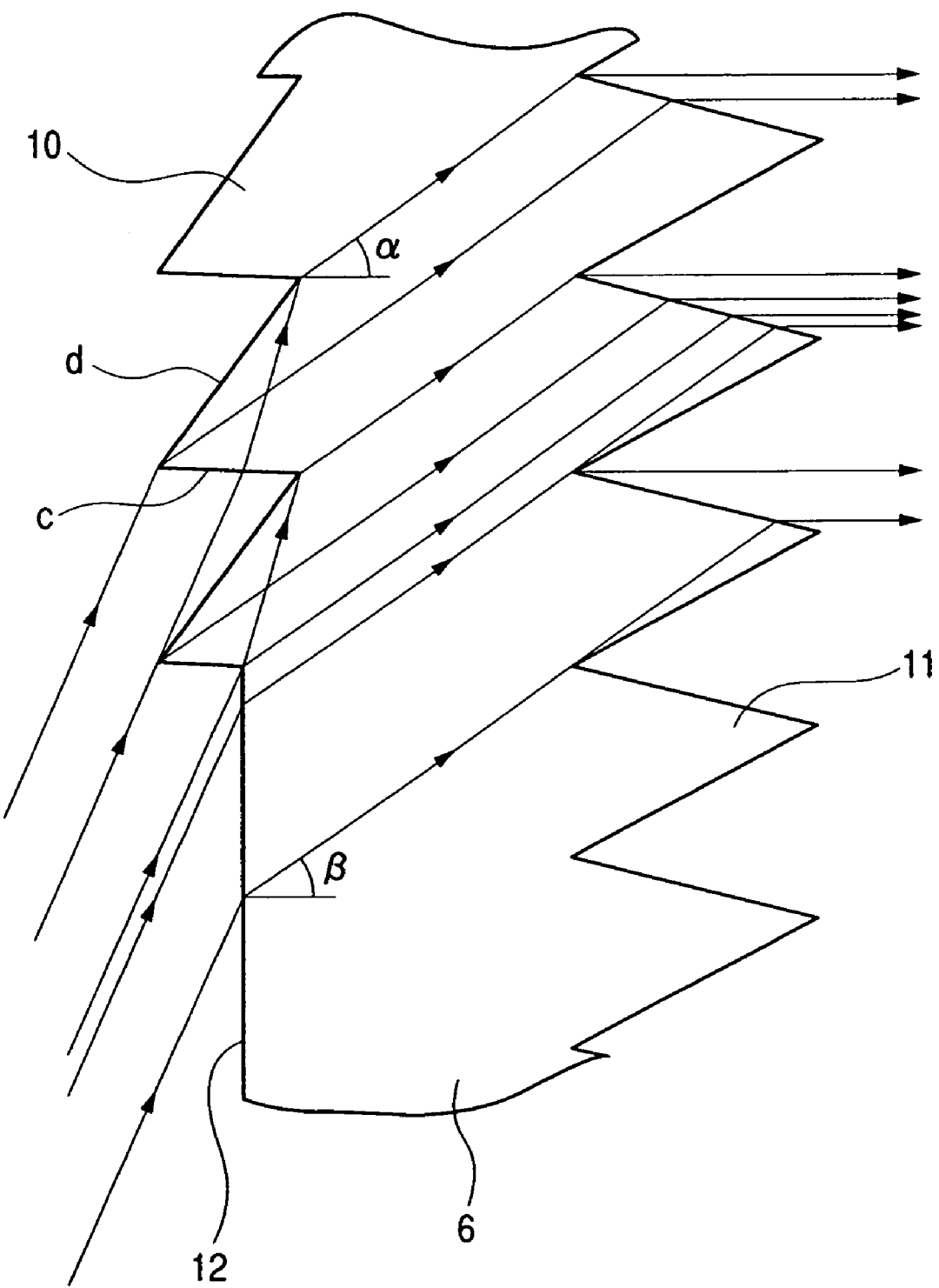
FIG. 13 is a vertical sectional view of the Fresnel lens sheet 6 used in the second embodiment, showing a boundary portion in which a total reflecting prism portion 11 is formed on an image generation source side.

FIG. 13 is a vertical sectional view of the Fresnel lens sheet 6 according to the second embodiment. As shown in FIG. 13, a predetermined area on the image generation source side of the Fresnel lens sheet 6 is a flat portion (plane portion) where the total reflecting prism portion 10 is not formed. More specifically, the above-mentioned predetermined area is an area on which image light is incident at a predetermined incidence angle (40) or less. If the angle of incidence on the Fresnel lens sheet 6 of a projection image projected from the optical part on the image generation source side is small, it is impossible to form the total reflecting prism portion 10. Therefore, in an area in which the angle of incidence of the projection image on the Fresnel lens sheet 6 is small, the image generation source side is flat and the refracting prism portion is formed on the monitoring side, like the conventional exit surface Fresnel lens. Thus, in the Fresnel lens sheet 6 according to the present invention, a sudden change occurs from the flat portion on the image generation source side to the portion where the total reflecting prism portion 10 is formed. Since the image generation source side and the monitoring side of the Fresnel lens sheet 6 are usually molded separately, the sudden change must be prevented from appearing in image. In the Fresnel lens sheet 6 according to the present invention shown in FIG. 13, angles α and β are set almost equal to each other. The angle α is an angle of light incident on the refracting prism portion 11 after incidence from surface c of the total reflecting prism portion 10 and after subsequent total reflection by surface d. The angle β is an angle of light incident on the refracting prism portion 11 after incidence from a flat portion 12 and after subsequent refraction. By setting the two angles almost equal to each other, the angle of light incident on the refracting prism portion 11 is almost constant. Accordingly, even if the image generation source side and the monitoring side of the Fresnel lens sheet 6 are somewhat displaced from each other, the angle of light outputted from the Fresnel lens sheet 6 is kept constant.

Figure 14A:
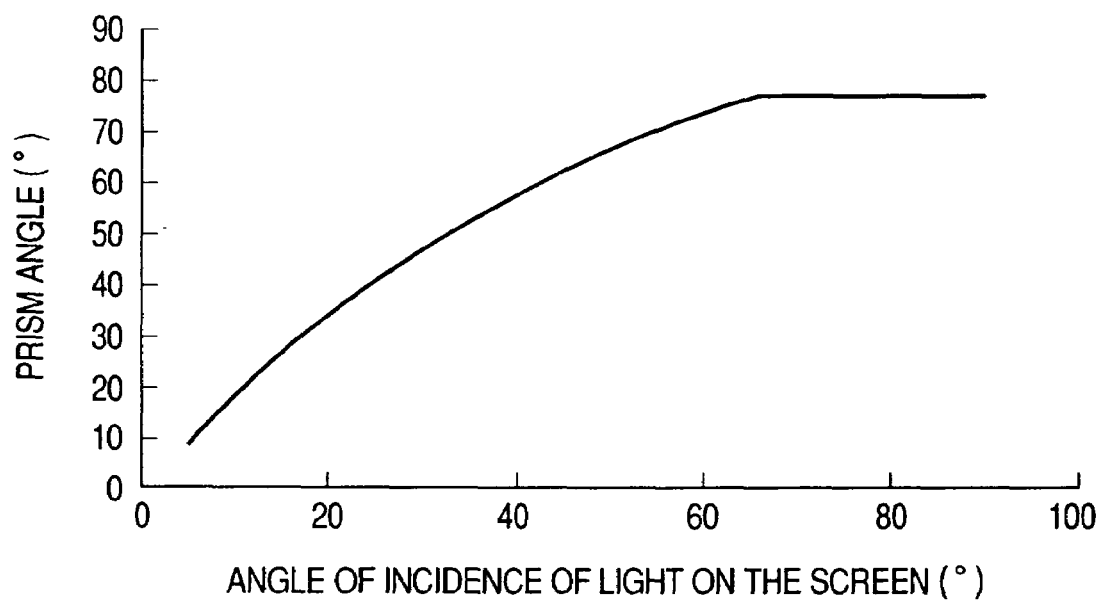
FIGS. 14A and 14B are graphs showing respectively a prism angle of a refracting prism portion 11 provided on a monitoring side of the Fresnel lens 6 used in the second embodiment and a loss of light caused by reflection of the same Fresnel lens sheet.
Figure 14B:
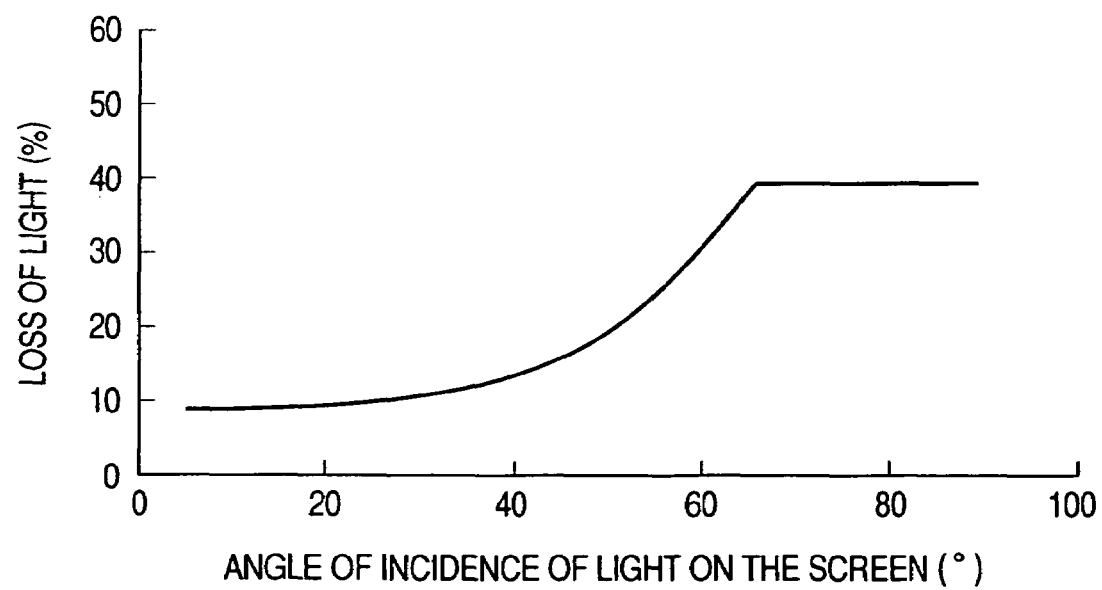

Next, with reference to FIGS. 14A, 14B and FIGS. 15A, 15B, a description will be given about a prism angle of the refracting prism portion 11 formed on the monitoring side of the Fresnel lens 6 according to the second embodiment. FIG. 14A shows a prism angle of the refracting prism portion 11 formed on the monitoring side of the Fresnel lens sheet 6 according to the second embodiment. FIG. 14B shows the loss of light caused by reflection of the Fresnel lens sheet 6.

Figure 15A:
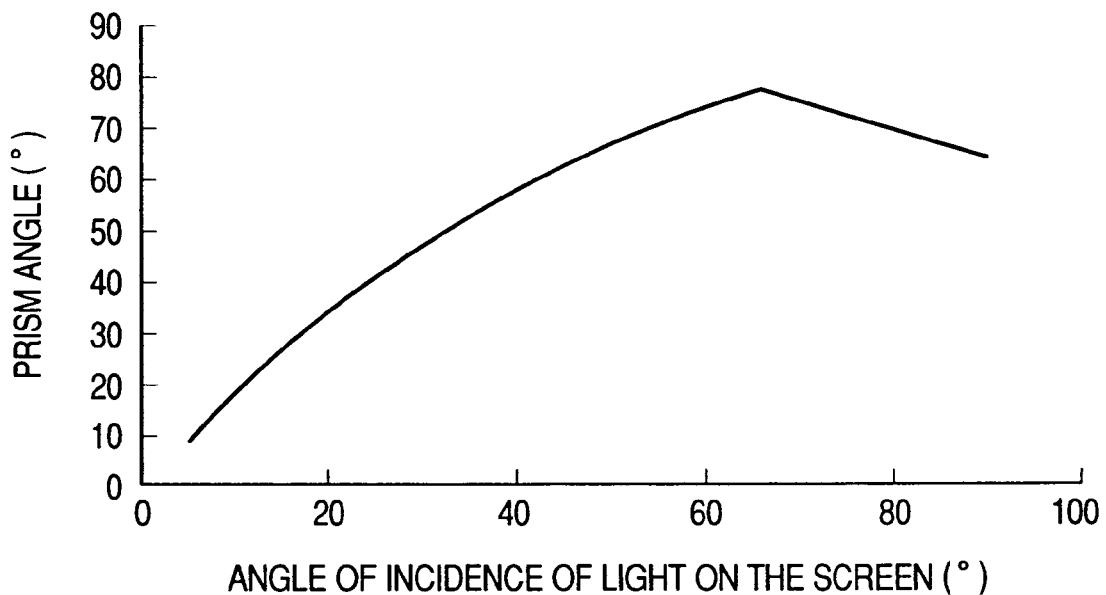
FIGS. 15A and 15B are graphs showing respectively a prism angle of a refracting prism portion 11 formed on a monitoring side of a Fresnel lens sheet 6 according to another example in the second embodiment and a loss of light caused by reflection of the same Fresnel lens sheet.
Figure 15B:
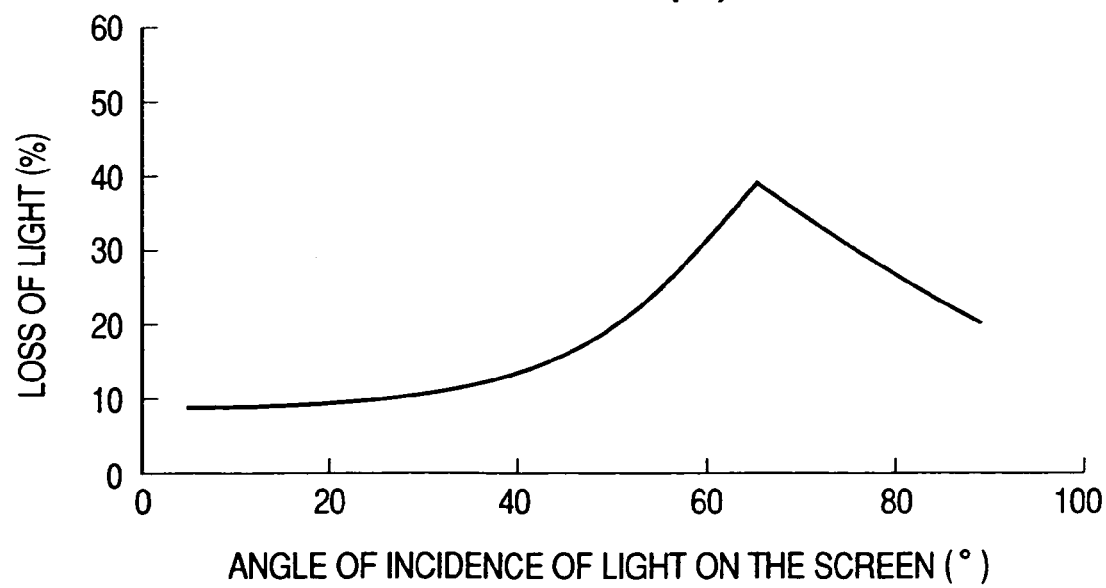

In both graphs, the angle of incidence of light on the screen is plotted along the axis of abscissa. As shown in FIG. 14A, from the point corresponding to an incidence angle of light on the screen of 67°, the prism angle of the refracting prism portion 11 becomes constant at 76°. This can be attained by forming the total reflecting prism portion 10 on the incidence surface from this point. The loss of light of the Fresnel lens sheet 6 according to this embodiment becomes almost constant as in FIG. 14B. The loss of light does not undergo a sudden increase unlike the reflection loss of the conventional Fresnel lens sheet referred to above. FIG. 15A shows a prism angle of a refracting prism portion 11 of a Fresnel lens sheet 6 according to another example in the second embodiment. FIG. 15B shows the loss of light caused by reflection of the same Fresnel lens sheet 6. In both graphs, the angle of incidence of light on the screen is plotted along the axis of abscissa. As shown in FIG. 15A, the prism angle of the refracting prism portion 11 becomes gradually smaller from the point corresponding to an incidence angle of light on the screen of 67°. This can be attained by enlarging the angle of surface d of the total reflecting prism portion 10 gradually from this point. At this time, the loss of light of the Fresnel lens sheet 6 becomes smaller gradually with the start point of the total reflecting prism portion 10 as a peak, as shown in FIG. 15B. The example shown in FIGS. 5A and 5B usually applies, but in such an image display device including a dark peripheral portion, the peripheral portion can be brightened by adopting the example of FIGS. 15A and 15B. In the present invention, the prism angle of the refracting prism portion 11 formed on the monitoring side of the Fresnel lens sheet 6 can be set freely in the ranges shown in FIGS. 14A, 14B and FIGS. 15A, 15B and therefore, it is possible to make design in accordance with the image display device concerned.

Figure 16:
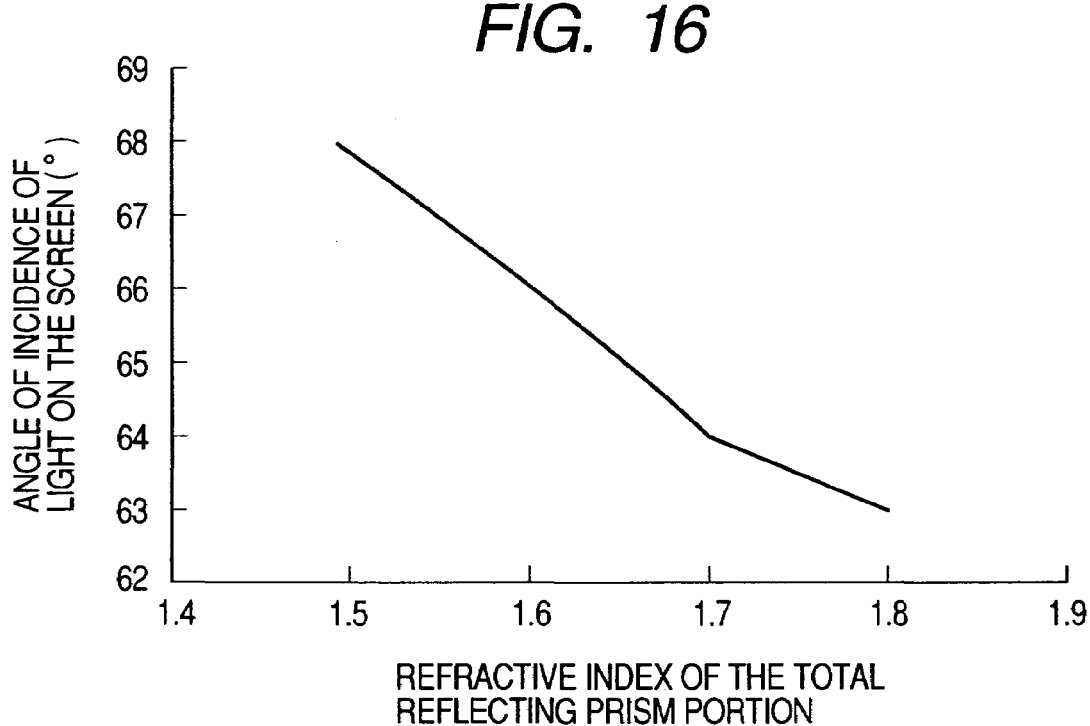
FIG. 16 is a graph showing a relation between a refractive index of a total reflecting prism portion 10 and the angle of incidence of light on the screen.
Figure 17:
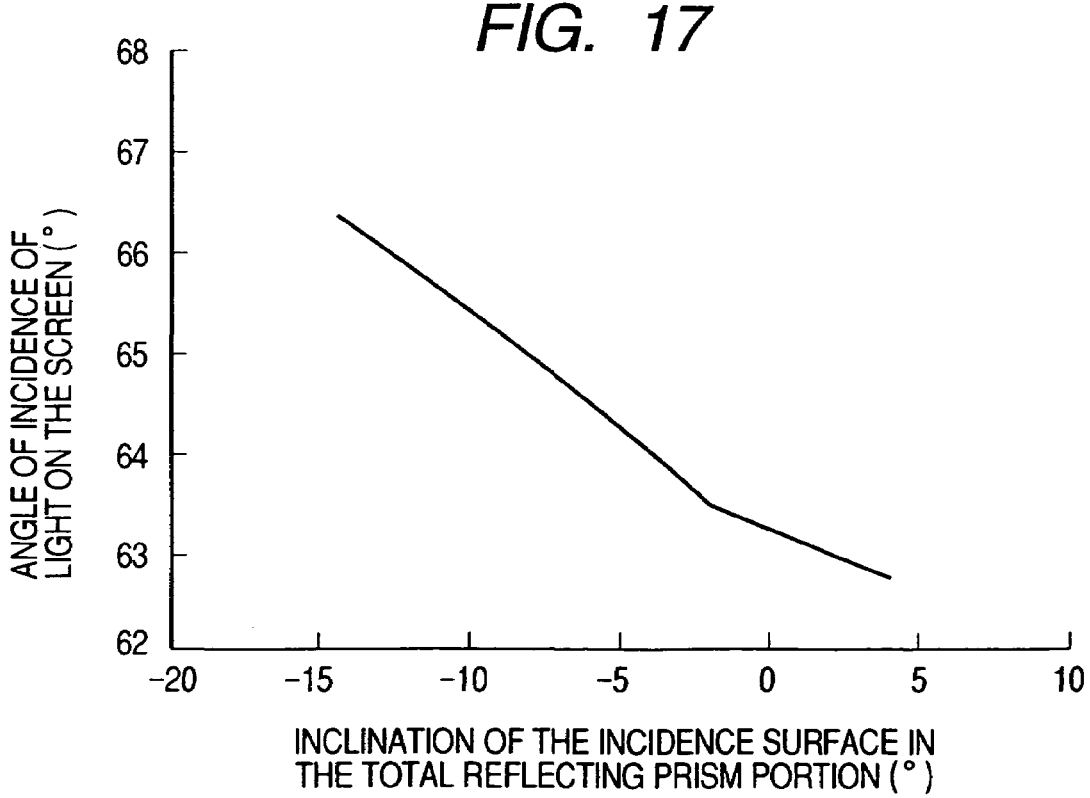
FIG. 17 is a graph showing a relation between the inclination of an incidence surface (surface c) of the total reflecting prism portion 10 and the angle of incidence of light on the screen.

In FIGS. 14A, 14B and FIGS. 15A, 15B, the angle of incidence of light on the screen at the position where the total reflecting prism portion 10 is formed is as large as 67°. The loss of light is also as larger as 35%. Means for diminishing these values will now be described with reference to FIGS. 16 and 17. FIG. 16 shows a relation between the refractive index of the total reflecting prism portion 10 and the angle of incidence of light on the screen. It is seen from FIG. 16 that the angle of incidence of light on the screen can be made small by increasing the refractive index of the total reflecting prism portion 10. In this case, the refractive index of the total reflecting prism portion 10 should be made at least larger than the refractive index of the material of the base which constitutes the Fresnel lens sheet. FIG. 17 illustrates a relation between the inclination of the incidence surface (surface c) of the total reflecting prism portion 10 and the angle of incidence of light on the screen. As to the inclination of the incidence surface (surface c) of the total reflecting prism portion 10, the same direction as the total reflection surface (surface c) is indicated with a negative sign. It is seen from FIG. 16 that the angle of incidence of light on the screen can be made small by setting the inclination of the incidence surface (surface c) of the total reflecting prism portion 10 in a negative direction. Generally, however, if the inclination of the incidence surface (surface c) of the total reflecting prism portion 10 is made negative, it becomes extremely difficult to effect manufacture. As to this manufacturing method, a description will be given later.

Figure 18A:
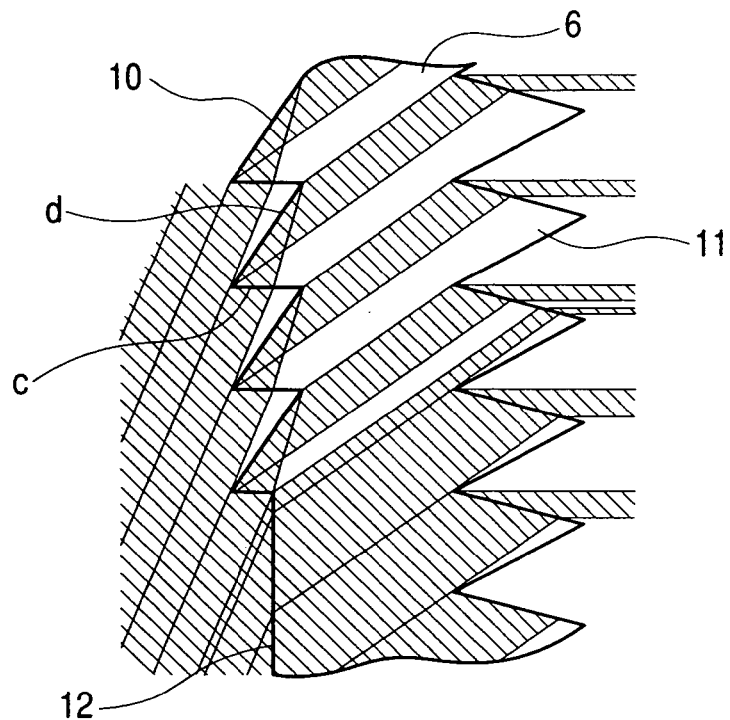
FIG. 18A is a vertical sectional view of a boundary portion in which the total reflecting prism portion 11 of the Fresnel lens sheet 6 in the second embodiment is formed.
Figure 18B:
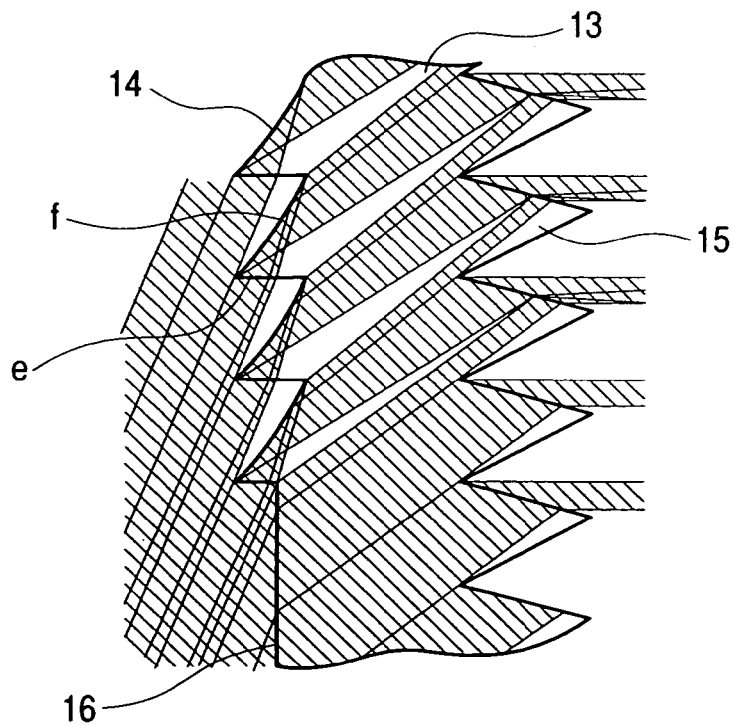
FIG. 18B is a vertical sectional view of a boundary portion in which a total reflecting prism portion of a Fresnel lens sheet according to another example in the second embodiment is formed.

Another example in the second embodiment will now be described with reference to FIGS. 18A and 18B. FIG. 18A is a vertical sectional view of the total reflecting prism portion 11 of the Fresnel lens sheet 6 according to the second embodiment. The figure is the same as in FIG. 13. In FIG. 18A, only light passing portions are hatched. The same reference numerals and marks as in FIG. 13 represent the same components and portions. As is apparent from FIG. 18A, the light is incident from the flat portion 12 free of the total reflecting prism portion 10 on the image generation source side. The light is then incident without break on the refracting prism portion 11 formed on the monitoring side. However, as to the light incident from the total reflecting prism portion 10 formed on the image generation source side, there exists a light-free portion in the refracting prism portion 11 formed on the monitoring side. The presence of such a light-free portion poses no problem if the following condition is satisfied. That is, the total reflecting prism portion 10 on the image generation source side and the refracting prism portion 11 on the monitoring side are located at just the same pitch without displacement. However, even a slight displacement between the two would lead to the occurrence of moiré. FIG. 18B is a vertical sectional view of a total reflecting prism portion according to another example in the second embodiment. In the figure, only light passing portions are hatched. In FIG. 18A, the numeral 14 denotes a total reflecting prism portion formed on an image generation source side of a Fresnel lens sheet 13. The numeral 15 denotes a refracting prism portion formed on a monitoring side. The numeral 16 denotes a flat portion where the total reflecting prism portion 14 on the image generation source side is not formed. In the Fresnel lens sheet 13 according to the present invention shown in FIG. 18B, light is incident on surface e of the total reflecting prism portion 14 and is totally reflected at surface f. Since the surface f is molded concavely to the image generation source side, the reflected light spreads and eventually becomes incident without break on the refracting prism portion 15 formed on the monitoring side. Therefore, even if the total reflecting prism portion 14 on the image generation source side and the refracting prism portion 15 on the monitoring side are slightly dislocated from each other, moiré does not occur.

Generally, molding of a prism portion of a Fresnel lens sheet is carried out using an ultraviolet curing resin. However, in the case where prism portions are formed on both faces of a Fresnel lens sheet as in the present invention, it is only one face that can be subjected to molding, because the ultraviolet curing resin does not transmit ultraviolet light. The Fresnel lens sheet according to the present invention can be fabricated in the following manner.

Figure 19:
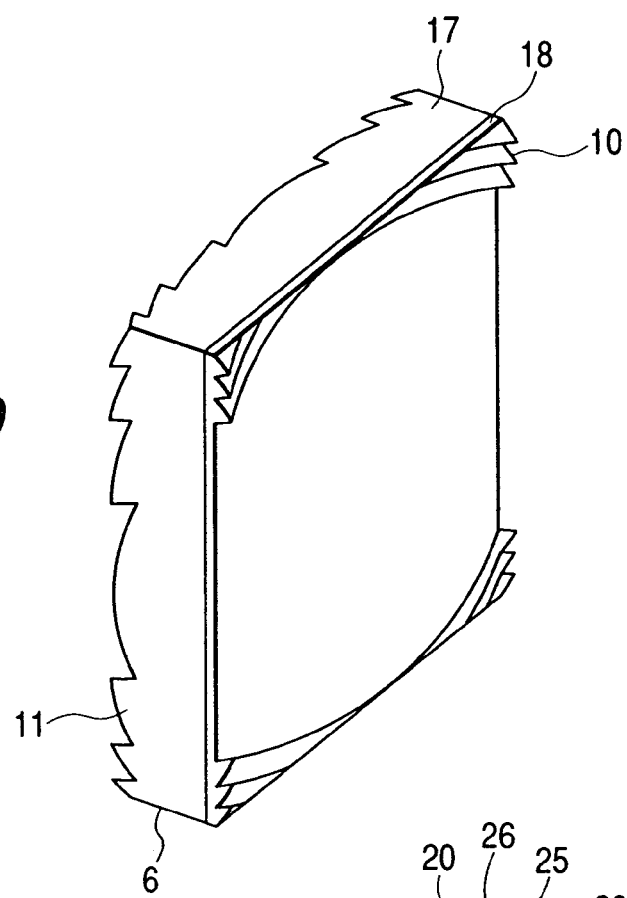
FIG. 19 is a diagram explaining a method of making a Fresnel lens sheet in the second embodiment.

FIG. 19 illustrates how to fabricate the Fresnel lens sheet according to the second embodiment. A refractory prism portion 11 is formed by molding on a transparent base 17 which constitutes the Fresnel lens sheet 6. A transparent ultraviolet curing resin layer 18 is bonded to the face of the transparent base 17 on which face the refracting prism portion 11 is not formed. A total reflecting prism portion 10 is formed by molding on the transparent ultraviolet curing resin layer 18. More specifically, the refracting prism portion 11 is formed on the image monitoring side by thermocompression-bonding the transparent base 17 such as polymethyl methacrylate or methyl methacrylate/styrene copolymer. Thereafter, the total reflecting prism portion 10 is formed on the opposite side with use of an ultraviolet curing resin. In the example shown in FIG. 19, the ultraviolet curing resin adheres not only to the total reflecting prism portion 10 but also to the plane portion to form a transparent ultraviolet curing resin layer 18.

Figure 20:
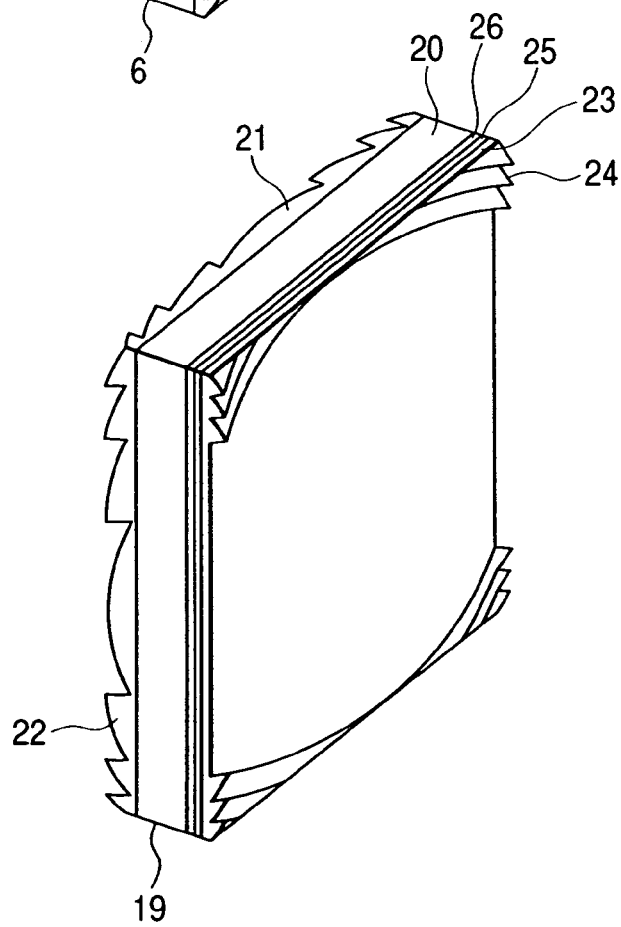
FIG. 20 is a diagram explaining another example of a method of making a Fresnel lens sheet in the second embodiment.

FIG. 20 illustrates another example of a method of making a Fresnel lens sheet according to the second embodiment. A first transparent ultraviolet curing resin layer 21 is bonded to a first transparent base 20 which constitutes a Fresnel lens 19. A refracting prism portion 22 is formed on the first transparent ultraviolet curing resin layer 21. A second transparent ultraviolet curing resin layer 23 is formed on the face of the first transparent base on which face the refracting prism portion 22 is not formed. A total reflecting prism portion 24 is formed on the second transparent ultraviolet curing resin layer 23. The second transparent ultraviolet curing resin layer 23 having the total reflecting prism portion 24 is formed on a second transparent base 25 by an ultraviolet curing method. The layer 23 is then fixed by bonding to the first transparent base 20 through an adhesive layer 26.

As the material of the first transparent base 20 which constitutes the Fresnel lens sheet 19, polymethyl methacrylate or methyl methacrylate/styrene copolymer may be used, for example. Polyethylene terephthalate may be used as the material of the second transparent base 25 for the second transparent ultraviolet curing resin layer 23 having the total reflecting prism portion 24. In this instance, polyethylene terephthalate has been subjected to a surface treatment to facilitate bonding of the ultraviolet curing resin. A highly transparent acrylic adhesive may be used as the adhesive layer 26. The second transparent ultraviolet curing resin layer 23 having the total reflecting prism portion 24 is bonded using the adhesive layer 26 in the above description. However, even if the first transparent ultraviolet curing resin layer 21 having the refracting prism portion 22 is bonded using the adhesive layer 26, the same effect can be attained.

Figure 21:
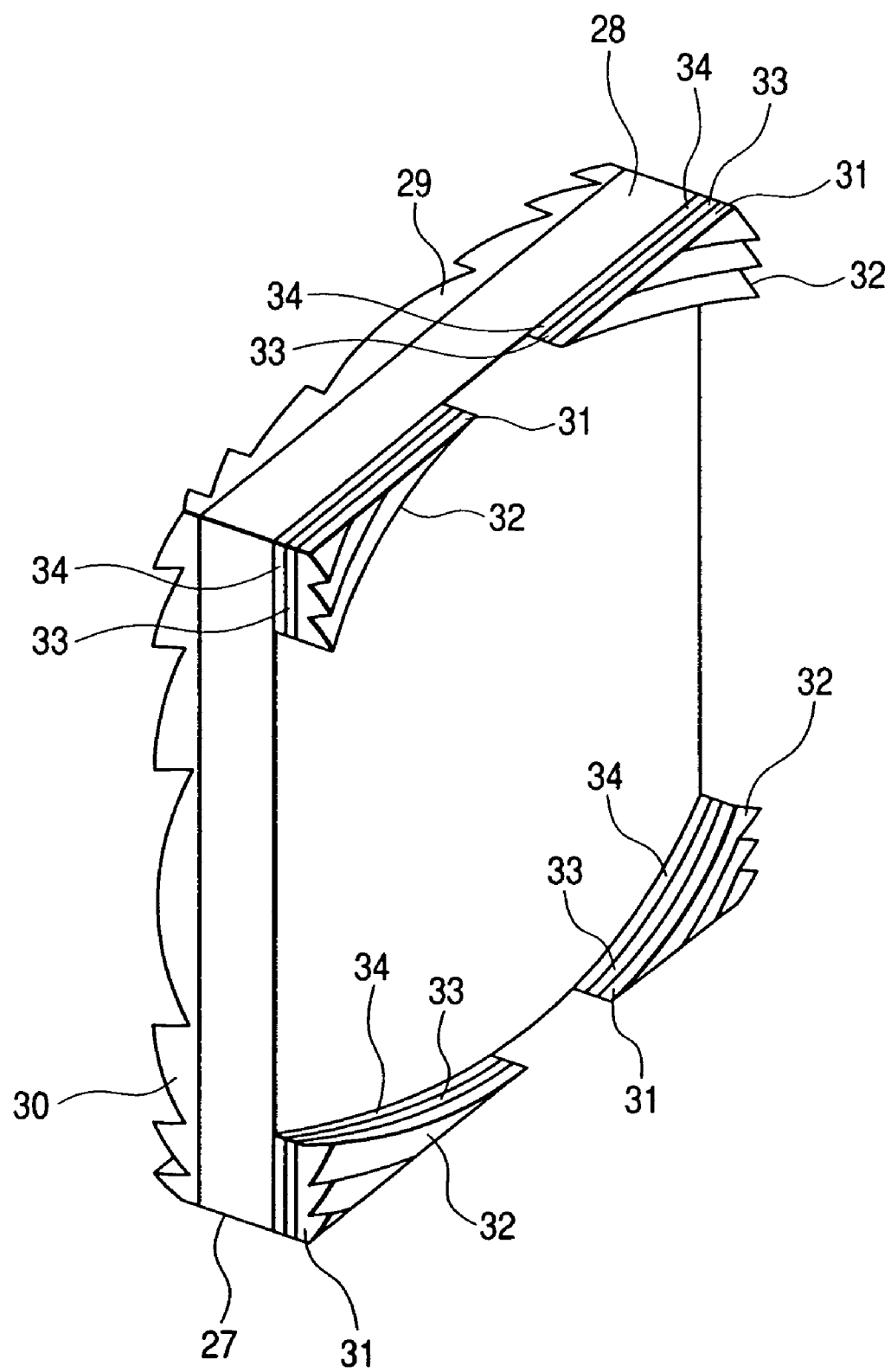
FIG. 21 is a diagram explaining a further example of a method of making a Fresnel lens in the second embodiment.

FIG. 21 illustrates a further example of a method of making a Fresnel lens sheet according to the second embodiment. A first transparent ultraviolet curing resin layer 29 having a refracting prism portion 30 is bonded to a first transparent base 28 which constitutes a Fresnel lens 27. A second transparent ultraviolet curing resin layer 31 having total reflecting prism portions 32 is formed on the first transparent base 28 on the side opposite to the side where the refracting prism portion 30 is formed. More specifically, the second transparent ultraviolet curing resin layer 31 having the total reflecting prism portions 32 is formed on a second transparent base 33 by an ultraviolet curing method. The layer 31 is thereafter fixed by bonding to the first transparent base 28 through an adhesive layer 34. In the example shown in FIG. 21, the second transparent ultraviolet curing resin layer 31 having the total reflecting prism portions 32 is divided into four. The second transparent ultraviolet curing resin layer 31, the second transparent base 33 and the adhesive layer 34 are omitted in the portion where the total reflecting prism portions 32 are not formed. This example is effective when the positions where the total reflecting prism portions 32 are formed are only the corner portions of the Fresnel lens sheet 27. The second transparent ultraviolet curing resin layer 31 having the total reflecting prism portions 32 and which is to be bonded to the first transparent base 28 may be the same at all of the four corner portions. The layer 31 at the four corner portions may be subjected to trimming where required. Further, the second transparent ultraviolet curing resin layer 31 having the total reflecting prism portion 32 is bonded at all of the four corners in this example. However, the positions where the total reflecting prism portions 32 are to be formed may be two in each of upper, lower, right, and left portions or may be an arbitrary one corner in accordance with what is required of the optical system used. By thus dividing the second transparent ultraviolet curing resin layer 31 having the total reflecting prism portions 32 as in FIG. 21, the following effect can be attained. That is, manufacture can be relatively facilitated even if the inclination of the incidence surface (surface c) of the total reflecting prism portion 10 is set negative as noted earlier. All that is required at the time of mold release is a mere movement toward a curvature center of the Fresnel lens. Suppose that the inclination of the incidence surface (surface c) of the total reflecting prism portion 10 is a little large in the negative direction. Even so, it is easy to effect mold release as long as the second transparent ultraviolet curing resin layer 31 and the second transparent base 33 are each formed of a flexible material.

According to the second embodiment, as set forth above, the optical axis center of the projection lens is set near the lower end of the rear projection type screen for diminishing the depth of the image display device. Consequently, the angle of incidence of image light on the light and left upper end portions of the screen becomes too large. Even so, it is possible to suppress a reflection loss of the screen. It is also possible to diminish the moiré phenomenon which occurs in the Fresnel lens sheet. Thus, according to the present invention, it is possible to obtain an image display device which is bright up to the right and left upper end portions of the screen.

What is claimed is:

1. A rear projection type screen on which an image generated from an image generation source is projected, said rear projection type screen comprising:
    a Fresnel lens sheet disposed at least on the image generation source side; and
    a diffusion sheet disposed on an image monitoring side to diffuse image light to the image monitoring side,
    said Fresnel lens sheet including a first prism which is convex toward the image generation source side and a second prism which is convex toward the image monitoring side,
    wherein said first prism includes a total reflection surface provided in a first area on the image generation source-side face of said Fresnel lens sheet, with light of the projection image being incident on the first area at an angle of not smaller than a predetermined incidence angle, said total reflection surface totally reflecting the light incident on the first area and conducting the reflected light to the image monitoring side of said Fresnel lens sheet,
    a second area on said Fresnel lens sheet on which light of the projection image is incident at an angle of smaller than the predetermined incident angle is in a plane shape, and
    said second prism is formed in an area opposed to said second area on the image monitoring-side face of said Fresnel lens sheet and functions to refract and output light which has entered second area and passed through said Fresnel lens sheet.

2. A rear projection type screen according to claim 1, wherein said predetermined incidence angle is about 40 degrees.

3. A rear projection type screen according to claim 1, wherein an area opposed to said first area on the image monitoring-side face of said Fresnel lens sheet is in a plane shape.

4. A rear projection type screen according to claim 3, wherein said second prism is formed in part of the area opposed to said first area on the image monitoring-side face of said Fresnel lens so as to be opposed to said first prism which is positioned near a boundary of said first and second areas.

5. A rear projection type screen on which light generated from an image generation source is projected, comprising:
- a Fresnel lens sheet having a first prism formed on the image generation source side and a second prism formed on an image monitoring side; and
- a lenticular lens sheet disposed on the image monitoring side of said Fresnel lens sheet, wherein, on said image monitoring side of said Fresnel lens sheet a first area and a second area are formed, to said first area to said light generated from said image generation source is incident at an angle of incidence of not smaller than a predetermined angle of incidence and to said second area said light generated from said image generation source is incident at an angle of incidence of smaller than the predetermined angle of incidence is in a plane shape;

said first prism is formed in said first, and said first prism includes an incidence surface on which the light is incident and a total reflection surface which totally reflects the light incident from said incidence surface and conducts it to said second prism.

* * * * *